March 22, 1927.

B. B. GUENTHER 1,621,666

LABEL FEEDING AND CUTTING MACHINE

Filed Aug. 20, 1923    3 Sheets-Sheet 1

Inventor
BERNARD B. GUENTHER

By Paul, Paul & Moore
ATTORNEYS

March 22, 1927.

B. B. GUENTHER 1,621,666

LABEL FEEDING AND CUTTING MACHINE

Filed Aug. 20, 1923   3 Sheets-Sheet 2

Inventor
BERNARD B. GUENTHER

By Paul, Paul & Moore
ATTORNEYS

March 22, 1927.　　　　　　　　　　　　　　　　　　　1,621,666
B. B. GUENTHER
LABEL FEEDING AND CUTTING MACHINE
Filed Aug. 20, 1923　　　3 Sheets-Sheet 3
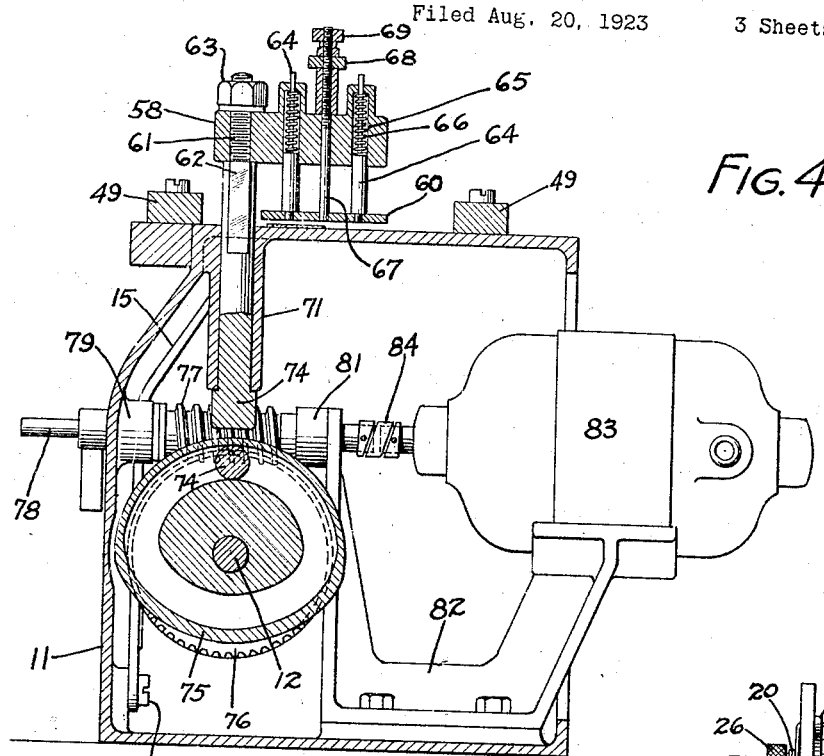
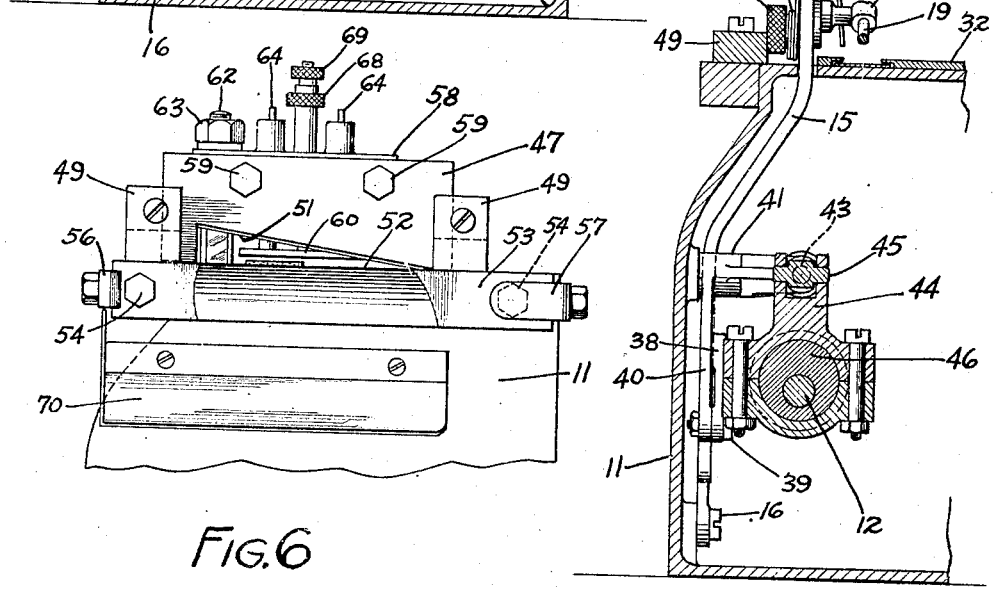
Inventor
BERNARD B. GUENTHER
ATTORNEYS Patented Mar. 22, 1927.

1,621,666

UNITED STATES PATENT OFFICE.

BERNARD B. GUENTHER, OF MINNEAPOLIS, MINNESOTA, ASSIGNOR OF ONE-THIRD TO CHARLES E. OVENSHIRE AND ONE-THIRD TO GEORGE F. DICKSON, BOTH OF MINNEAPOLIS, MINNESOTA.

LABEL FEEDING AND CUTTING MACHINE.

Application filed August 20, 1923. Serial No. 658,334.

This invention relates to improvements in tape-cutting machines particularly adapted for use in cutting tape, upon which labels are inscribed, into sections, such sections forming labels adapted to be sewed onto fabricated materials as an identification mark of the manufacturers thereof.

The object of this invention is to provide a machine for feeding different widths of tape and cutting it into predetermined lengths or sections to be used for labels.

A further object is to provide a tape or label-cutting machine having means for varying the stroke of the feeder arm and blade to accommodate it to the length of the label interwoven in or printed on the tape.

A further object is to provide such a machine having improved upper and lower cutting members arranged so as to have a shearing action.

A further object is to provide a machine of simple and inexpensive construction which may be manufactured at a minimum cost and which will be positive in its operation.

Other objects of the invention will appear from the following description and the accompanying drawings, and will be pointed out in the annexed claims.

In the drawings there has been disclosed a structure designed to carry out the various objects of the invention, but it is to be understood that the invention is not confined to the exact features shown, as various changes may be made within the scope of the claims which follow.

In the accompanying drawings forming part of this specification:

Figure 4 is a cross sectional view on the line 4—4 of Figure 2, showing the means provided for holding the tape while it is being severed;

Figure 5 is a detail sectional view on the line 5—5 of Figure 2, showing the means provided for actuating the feeder arm;

Figure 6 is a detail view of a portion of the front of the machine, showing the reciprocating knife blade and pressure bar in elevated position;

Figure 2:
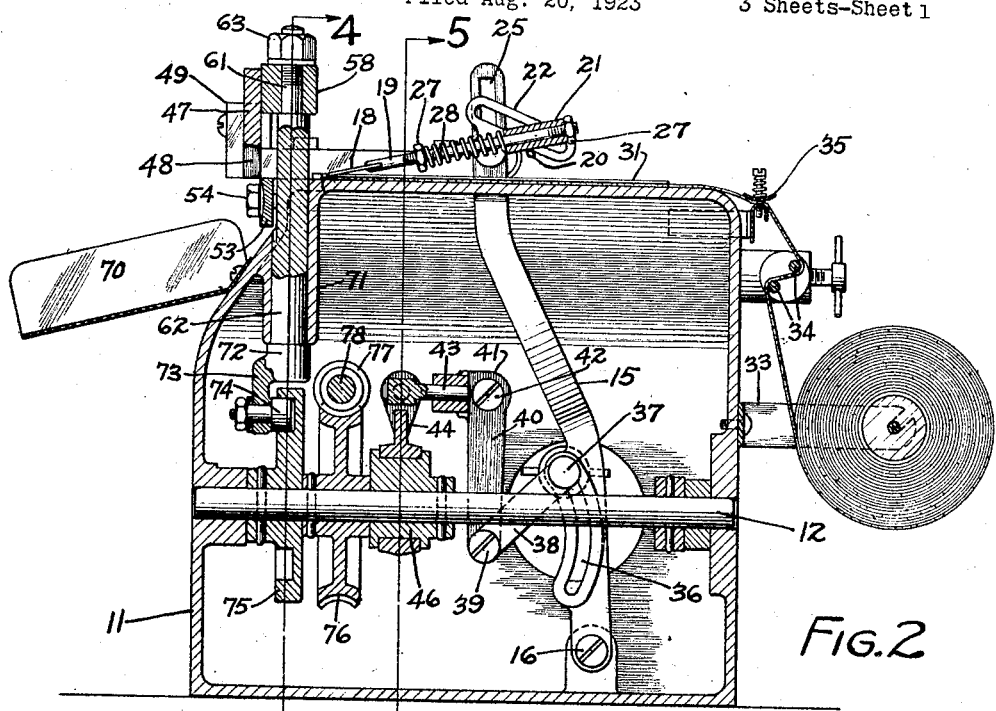
Figure 2 is a vertical sectional view on the line 2—2 of Figure 1, showing the feeder arm and blade in forward position and also showing the means provided for adjusting the stroke of the arm.
Figure 3:
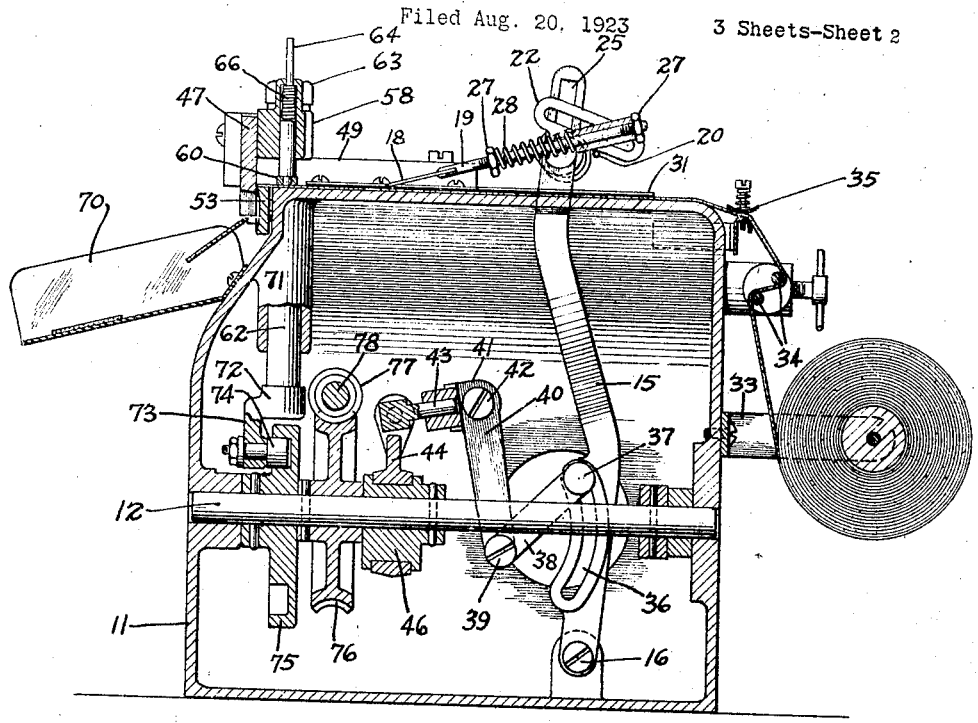
Figure 3 is a view similar to Figure 2, showing the feeder arm in normal or returned position.

As shown in the drawings, the machine comprises a frame casing 11 preferably of metal, having a horizontal operating shaft 12 rotatably mounted in bearings provided in the walls thereof, as shown in Figures 2 and 3. A feeder arm 15 is pivotally mounted upon a pin 16 secured to the wall of the casing. This arm is preferably irregular in form and extends upwardly through a slotted or elongated opening 17, provided in the top of the casing 11. The upper portion of the feeder arm is adapted for oscillatory movement within the opening 17 to feed the tape towards the cutting mechanism.

A feeder blade 18, having a short threaded stem or rod 19 secured thereto, is adjustably mounted within a carrier block 21, which in turn is adjustably mounted in a slotted adjusting member 22 by means of a knurled nut 23. The adjusting member 22 is pivotally mounted upon a shouldered stud 24, adapted to vertical adjustment within an elongated aperture 25 provided in the upper portion of the feeder arm. A knurled nut 26 is in threaded engagement with the end of the stud 24 to lock the member 22 in adjusted position upon the feeder arm. The feeder blade 18 and stem 19 are yieldingly held in adjusted position with reference to the carrier block 21, by the nuts 27 in threaded engagement with the stem 18 and a coiled compression spring 28, coiled about the stem between the lower nut 27 and the lower face of the hub of the carrier block 21, as clearly shown in Figures 1, 2 and 3. The lower or contacting edge 29 of the feeder blade 18 is preferably serrated, as shown in Figure 2, to enable it to more readily engage the ribs or raised stitching 30, as shown in Figures 1, 7, 8 and 9, and thus feed the tape to the severing mechanism, without danger of slippage. A suitable spring 20 is coiled about the reduced portion of the knurled nut 26, and has one end secured to the feeder arm 15, while its other end is connected to the carrier block 21 in such a manner as to impart a slight downward pressure to the serrated feeder blade 18. Thus, the blade will be yieldingly held against the surface of the tape the full length of its return stroke in position to engage the raised ribs or stitching as soon as it commences its forward or feed stroke, or at some other point in its forward stroke. The feeder blade on its back stroke will slide over the tape and will also slide on the tape during its forward stroke until it contacts with a raised portion of the tape. This contact may be at the beginning of the forward stroke, as stated above, or near the end thereof or at an intermediate point depending upon the relative position of the blade and the raised portion of the tape at the beginning of the stroke. In this way, I am able to compensate for variation in the length of the stitched label on the tape or the distance between the labels and insure the severing of the tape at the proper point between the labels. If the feeder blade positively engaged the tape at the beginning of its forward stroke and fed it the same distance with each stroke regardless of the position of the labels, the variation in the length of the stitched labels and the distance between them would cause the severing of the tape at different points and occasionally the point of severance would be directly through the label itself. By mounting the feeder blade to slide forward on the tape until it contacts with a raised portion I am able to avoid this difficulty and insure the severing of the tape at the desired point between the labels.

Figure 1:
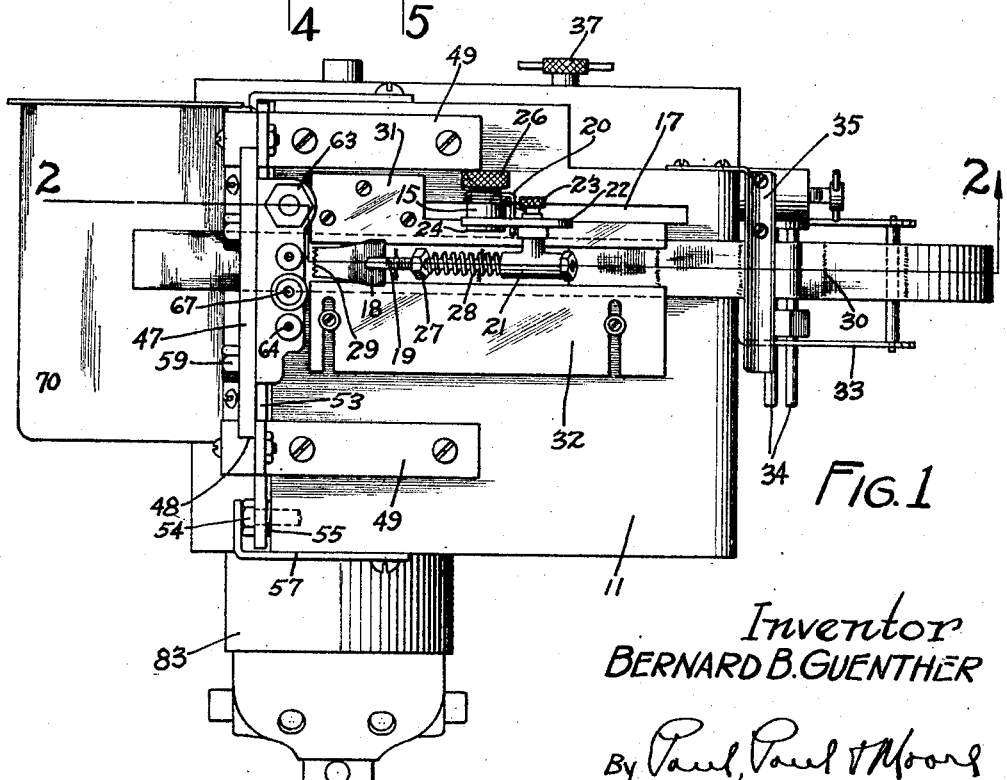
Figure 1 is a plan view of a tape-cutting machine showing my invention applied thereto.

Suitable guide plates 31 and 32 are secured to the top wall of the frame casing 11 for the purpose of guiding the tape and preventing it from buckling while being fed across the machine. As shown in Figure 1, the guide plate 32 is preferably adjustably secured to the casing to permit adjustment thereof for different widths of tape.

As shown in the drawings, the tape is preferably wound upon a core in the form of a spool, and supported upon a bracket 33 secured to the casing wall. From the spool it passes through a pair of adjustably mounted smoothing bars or rods 34, thence through a suitable tension means 35 and over the top of the casing between the guide plates 31 and 32 where it may be fed into the severing mechanism by the reciprocal movement of the feeder blade 18.

The means provided for actuating the feeder arm 15 consists preferably in the provision of an arcuately formed elongated aperture 36 in the lower portion of the arm 15, adapted to receive an adjusting screw 37 to which a connecting link 38 is pivotally connected. The other end of the link 38 is similarly connected by a pin 39 to the depending arm 40 of a suitable off-set bell-crank 41 pivotally mounted upon a pivot pin 42 secured to the casing wall. The upper off-set portion of the bell-crank 41 is apertured to receive one end of a suitable knuckle pin 43, having a square head pivotally connected to the upper forked end of an eccentric rod 44, by means of a pin 45 secured to the head. As shown in Figure 5, the upper portion of the bell-crank is off-set sufficiently to bring the knuckle pin 43 in substantially vertical alignment with the operating shaft 12. The lower portion of the eccentric rod 44 is preferably capped and suitably bored to receive a flanged eccentric 46 secured to the operating shaft 12, as clearly shown in Figures 2 and 3. Thus, by the employment of the above described mechanism a simple universal connection is provided between the bell-crank 41 and the eccentric rod 44, adapted to transmit a positive movement to the feed arm 15, when the operating shaft 12 is rotated. By changing the relative position of the adjusting screw 37, the stroke of the feeder arm 15 and blade 18 may be increased or decreased, as desired, to accommodate it to labels of various lengths.

Referring to Figures 2 and 3 it will be noted that the elongated aperture 36, provided in the lower portion of the feeder arm 15, is substantially in the form of an arc, drawn from the center of the pivot pin 39, when the arm is positioned as shown in Figure 2. When the parts are thus positioned, it will be readily seen that the adjusting screw 37 may be relatively adjusted in the aperture 36 to increase or decrease the feed stroke, without changing the relative position of the serrated edge 29 of the feeder blade 18 with reference to the severing mechanism, thereby causing the forward edge of the feeder blade to reach a predetermined point at the end of each forward or feed stroke, regardless of the length of the stroke.

An important feature of this invention resides in the novel mechanism provided for severing the tape. This mechanism consists of an upper member or blade 47 reciprocally mounted in vertical guide-ways 48, provided in blocks 49 secured to the top wall of the casing 11. As shown in Figure 6, the lower or cutting edge 51 of the blade 47 is preferably inclined so as to have a shearing action when in contact with the complementary cutting edge 52 of the lower knife blade 53. As particularly shown in Figures 8 and 9, the lower blade 53 is preferably hollow ground or concaved to provide the cutting edge 52. This blade is yieldingly mounted upon the upper forward portion of the frame casing, having its upper edge substantially on a level with the upper surface of the casing 11 so that the tape may be fed thereover by the feeder blade without interruption.

Figure 7:
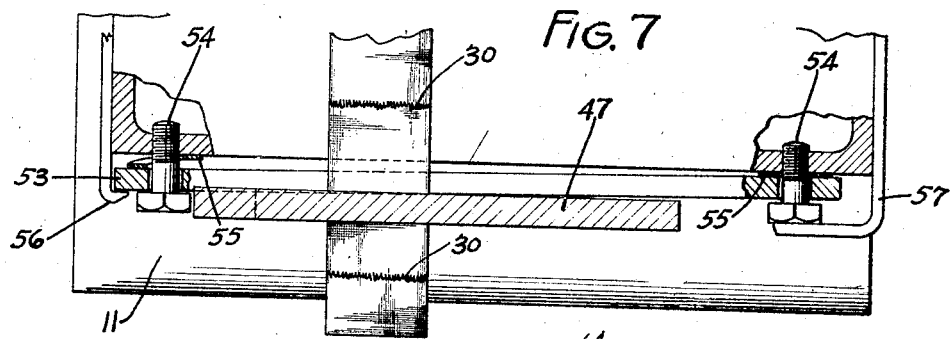
Figure 7 is a detail plan view of the cutting members, partially in section, showing how the lower cutting member is yieldingly mounted upon the frame of the machine.
Figure 8:
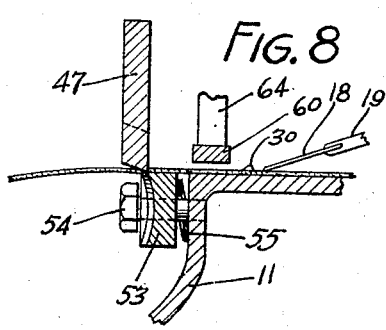
Figure 8 is a diagrammatical sectional view on the line 8—8 of Figure 7, showing the relative position of the cutting members and pressure bar when in normal or inoperative position.
Figure 9:
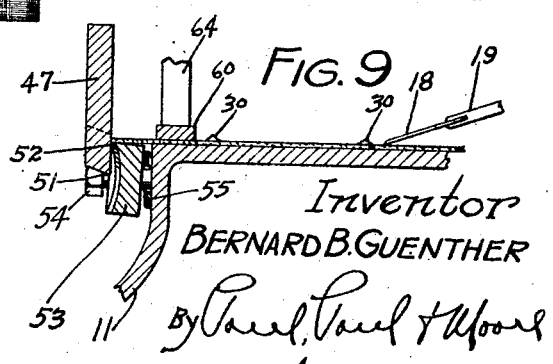
Figure 9 is a view similar to Figure 8 showing the position of the parts during the severing operation and also showing the point contact between the cutting members.

As shown in Figure 7, each end of the blade 53 is apertured to receive a pair of screws 54 in threaded engagement with the wall of the casing. Split spring washers 55 are preferably mounted on each screw between the blade and the casing wall adapted to yieldingly hold the blade in outward or normal position. An adjustable stop 56 is preferably provided at the end of the blade adjacent the lagging cutting end of the upper blade 47 to limit the outward movement thereof, and also to provide means for relatively adjusting the cutting edge 52 of the lower blade to the inclined cutting edge 51 of the upper blade 47. The outward movement of the other end of the blade is preferably limited by the head of the screw 54. An angular bar 57 is secured to the casing wall adjacent the end of the blade, having one end adapted to overhang the head of the screw and to be in engagement therewith to prevent it from changing its relative position after having been properly adjusted. The apertures in the knife blade 53 are also preferably a little larger than the diameter of the screws 54, thereby allowing the blade to slightly rock upon the screws when engaged by the upper blade 47 during the severing operation, as clearly shown in Figure 9. It will also be noted by referring to Figure 7, that the lower blade 53 is mounted upon the frame preferably at a slight angle with reference to the cutting edge 51 of the upper blade 47 and with reference to the casing wall. In adjusting the angular position of the blade 53, the end of the blade adjacent the leading end of the upper blade 47, will be adjusted so as to allow the leading cutting edge 51 of the blade 47 to pass thereby without interference, when the upper blade commences its downward movement. The other end of the blade 53 will be spaced at a relatively greater distance from the casing wall, thereby bringing that end of the blade partially under the upper blade 47, as shown by the dotted lines in Figure 7. As soon as the upper blade 47 commences its downward movement or stroke, the leading portion of the inclined cutting edge 51 thereof will be brought into direct contact with the cutting edge 52 of the yieldingly mounted lower blade 53. As the blade 47 continues its downward movement the cutting edge 52 of the lower blade will be yieldingly held in contact with the inclined cutting edge 51 of the upper blade, and, owing to the relatively angular position of the lower blade, the pressure of the cutting edge 51 of the upper blade against the cutting edge 52 of the lower blade will cause the blade 53 to be forced inwardly or to recede towards the casing wall.

By this novel construction and mounting of the two knife blades the cutting edges 51 and 52 thereof will be in engagement with each other by substantially a point contact, similar to the contact provided between the blades of a pair of ordinary shears. The action of the blades in severing the tape will also have a shearing effect, thereby providing a severing mechanism which will positively produce a smooth clean cut at each stroke of the upper blade 47.

The means provided for actuating the upper blade 47 consists preferably in the provision of a knife holder block 58 to which the blade 47 is secured by suitable screws 59. The block 58 is mounted upon the reduced end portion 61 of a plunger rod 62 and secured thereto by a nut 63. As shown in the drawings, the plunger rod 62 is preferably secured to the knife holder block 58 at one end thereof, for the purpose of providing clearance for the tape and also to provide room for a yieldingly mounted presser bar 60, carried by the knife holder block, as particularly shown in Figure 4. As here shown, the presser bar or tape-holding bar 60 is supported by a pair of shouldered pins or rods 64 slidably mounted in sockets 65 provided in the block 58. The pins 64 preferably have their upper portions reduced in diameter to receive a pair of suitable compression springs 66, coiled thereabout and adapted to impart a downward pressure to the presser bar 60. An adjustable stop is provided to limit the downward movement of the presser bar when in normal raised position. This stop consists preferably of a stem 67 having one end suitably secured to the pressed bar 60 and extending upwardly therefrom through the knife holder block 58. The upper portion of the stem 67 is threaded to receive an adjusting nut 68 and lock nut 69, by means of which the presser bar 60 may be relatively adjusted to provide sufficient clearance between it and the top surface of the casing to allow the tape to be fed there-between, and also to properly time it with reference to the feeding of the tape by the feeding arm and blade 18. A chute 70 is secured to the casing to receive the labels as they are severed from the strip of tape.

The plunger rod 62 is reciprocally mounted within a vertical guide or bearing 71, preferably integrally formed in the frame casing. An integral head 72, having a depending off-set lug 73, is provided at the lower end of the rod 62, as shown in Figures 2 and 3. An anti-friction roller 74 is mounted in the lug 73 adapted to travel in a grooved cam 75, secured to the operating shaft 12. Thus, when the shaft 12 is rotated, a reciprocal movement will be transmitted to the plunger rod 62 and therefore the upper knife blade 47 and presser bar 60.

Means are also provided for driving the operating shaft 12 to actuate the operating mechanism. A worm-gear 76 is mounted upon the operating shaft 12 adapted to be engaged by a worm 77 secured to a drive shaft 78, which has one end mounted in a bearing 79 provided in the casing wall, while its other end is preferably mounted in a bearing 81 integrally formed at one end of a suitable motor bracket 82 secured to the bottom wall of the casing, as shown in Figure 4. A suitable motor 83 is secured to the bracket 82 and has its shaft connected to one end of the drive shaft 78 by means of a flexible coupling 84, of ordinary construction. Thus, when the motor 83 is started the power therefrom will be transmitted through the drive shaft 78, worm 77 and worm-wheel 76 with the resultant rotation of the operating shaft 12 and therefore the feeding and severing mechanism.

*Operation.*

In the operation of this novel label feeding and cutting machine the feeding and severing mechanism is first timed so as to allow the tape to be fed between the knife blades 47 and 52, while the upper blade 47 is at the top of its stroke or in normal position. As soon as the serrated feeder blade 18 reaches the end of its forward or feed stroke, the plunger rod 62 will commence its down stroke, causing the presser bar 60 to engage the tape and securely hold it against the top surface of the casing while the label is being severed, and during the return stroke of the feeder blade 18, sliding upon the surface of the tape. As soon as the feeder blade 18 reaches the end of its return stroke, which will vary with respect to the position of the adjacent label, the presser bar 60 will release the tape and the feeder blade will commence its next forward or feed stroke, and will slide on the tape until it contacts with a label or other raised portion when the forward movement of the tape to the severing knives will begin and will continue throughout the rest of the stroke of the feeder.

From the foregoing, therefore, it will be readily seen that after the machine has been properly adjusted and timed, and as long as the motor continues uninterruptedly, it will continue automatically to feed or cut the labels a predetermined length without any attention on the part of the operator. Thus, I am enabled to provide a machine requiring very little care in its operation and also one of very simple and inexpensive construction capable of feeding and cutting practically all sizes of labels and cut the labels at the desired point regardless of variation in the length of the stitched portion or variation in the distance on the tape between the stitched or raised portions.

I claim as my invention:

1. In a label-cutting machine, a table having guides, a pivoted feed arm having an arcuate slot and a feed dog pivoted to said lever, said arm adapted to advance to and stop at a predetermined point and correspondingly advance strip material in the guides, a drive-shaft having an eccentric thereon, a bell-crank, and extending transversely between said lever and feed arm and having a pivot slidable in the arcuate slot, the center of curvature of the slot being at the pivotal center of the link.

2. A label-cutting machine comprising a table having guides on its upper surface, a feed arm pivoted below the guides and extending thereabove and having a pivoted feed dog engageable to feed strip material through the guides to a predetermined point, and further having an arcuate slot intermediate its pivotal point and said feed dog, a driven shaft, a bell-crank lever, having an arm extending in substantially the same direction as the feed arm, connections between the shaft and other arm of the bell-crank lever for oscillating the lever, and a link pivoted to the first mentioned arm and having a pivot slidable in said arcuate slot, the center of curvature of the slot being at the pivotal center of said link.

3. A label-cutting machine comprising a casing having a surface over which the tape from which the labels are cut is fed, a feeder mounted to reciprocate on said surface and having an edge to engage raised portions of the tape to feed it, a feeder arm having means for adjustable connection with said feeder to impart a reciprocating movement thereto, mechanism for oscillating said arm and varying its length of stroke to correspondingly change the stroke of said feeder, said feeder being adapted to slide over the raised portions of the tape on its back stroke and slide forwardly on the tape until it engages a raised portion, the point of engagement of said feeder with a raised portion varying in the different forward strokes of the feeder to vary the length of feed and compensate for the difference in length of the raised portion or the distances between them.

4. A tape-cutting machine comprising a casing having a surface over which the tape is fed, a feeder mounted to reciprocate on said surface and engage and feed the tape, a feeder arm projecting above said surface and having a slotted upper end, an adjusting member pivotally mounted in said slotted end, a carrier block supporting said feeder and carried by said adjusting member and movable therewith, and severing knives mounted adjacent to said feeder.

5. In a label-cutting machine, means for feeding the tape, a stationary knife and movable knife, said stationary knife having means for holding its cutting edge toward the corresponding edge of said movable knife with a yielding pressure and said movable knife having an edge for contact progressively with the edge of said stationary knife to make a shear cut.

6. In a label-cutting machine, means for feeding the tape from which the labels are cut, a label-severing means comprising a stationary knife having a longitudinal cutting edge and a concave face on one side, means for holding said stationary knife with a yielding pressure, a movable knife having a cutting edge arranged to contact with the corresponding edge of said stationary knife, said stationary knife yielding under pressure of the movable knife thereon and the cutting edges of said knives cooperating to make a shear cut of the tape.

7. A label-cutting machine comprising a table having guides, a pivoted feed arm having an arcuate slot, and a pivoted feed dog adapted to advance to and stop at a predetermined point to correspondingly feed material through said guides, a pivoted lever substantially parallel with said feed arm, a link pivoted to the lever and having a pivot slidably adjustable in said arcuate slot, the center of curvature of the slot being at the pivotal center of the link, and means for oscillating the lever, whereby the length of the feed stroke rearwardly of the predetermined point of advance can be changed without changing the relation of the feed dog to its predetermined forward stopping point.

8. A tape cutting machine comprising a casing having a surface over which the tape is fed, a feeder arm projecting above said surface, a member mounted for vertical adjustment on said arm, a carrier block having a spring pressed pivotal support on said member, a feeder yieldingly mounted in said block to reciprocate over said surface and feed the tape, the adjustment of said member changing the angle of said feeder to the work and severing knives adjacent said feeder.

9. A label-cutting machine, a casing, means for feeding the tape to be cut thereon, a stationary blade having holes therein and screws fitting loosely within said holes for mounting said blade on said casing, spring washers for holding said blade outwardly with a yielding pressure, said blade having a limited freedom of longitudinal rocking on said screws, and a movable blade having a cutting edge adapted to engage the edge of said stationary blade with a shear cut one of said screws being adjusted to move said stationary blade out of horizontal alignment with said movable blade.

10. A label-cutting machine comprising a casing, a feeder arm pivoted at its lower end in said casing, and projecting upwardly through the top of said casing, a shaft mounted in said casing a worm wheel on said shaft, a worm meshing with said wheel to revolve said shaft, an eccentric on said shaft, an eccentric strap, means adjustably connecting said eccentric strap and said feeder arm for varying the stroke of said arm, said casing having a surface adjacent the upper end of said arm over which the tape is fed, a feeder blade connected with said feeder arm and engaging said tape to feed the same over said surface, and a tape-severing means adjacent said feeder blade.

11. A label-cutting machine comprising a casing, a motor mounted therein, a shaft journaled in said casing and having a worm and worm wheel driving connection with said motor, an oscillating feeder arm mounted in said casing, an eccentric on said shaft, a bell crank connecting said eccentric with said feeder arm, mechanism connecting said shaft and said feeder arm for operating it and varying its length of stroke, a feeder blade connected with said arm and positioned to contact with the tape from which the labels are cut, a stationary severing knife mounted adjacent said feeder blade, a movable knife mounted in guides above said stationary knife and mechanism connecting said movable knife with said shaft for imparting a reciprocating movement to said movable knife synchronously with the movement of said feeder arm.

12. In a label-cutting machine, means for feeding the tape from which the labels are cut, a severing means comprising a normally stationary blade, means for adjusting the ends of said blade transversely and horizontally independently of each other yielding means in the rear of said blade ends for holding one blade end outwardly from its support a greater distance than the other end, and a movable blade having a cutting edge adapted for a single point shear contact with the cutting edge of said stationary blade through its oblique adjusted position.

13. In a label-cutting machine, means for feeding the tape from which the labels are cut, a severing means comprising a normally stationary blade, means supporting said blade with its cutting edge transversely of the tape, means for adjusting the ends of said blade in the direction of movement of the tape and yieldingly holding it in its adjusted positions, and a movable blade having a cutting edge adapted for single point shear contact with the cutting edge of said stationary blade.

In witness whereof, I have hereunto set my hand this 15th day of August, 1923.

BERNARD B. GUENTHER.